US009196389B2

(12) United States Patent
Bertch et al.

(10) Patent No.: US 9,196,389 B2
(45) Date of Patent: Nov. 24, 2015

(54) SYSTEMS AND METHODS FOR EFFICIENTLY PREPARING PLUTONIUM-238 WITH HIGH ISOTOPIC PURITY

(71) Applicant: GENERAL ATOMICS, San Diego, CA (US)

(72) Inventors: Timothy Creston Bertch, San Diego, CA (US); Lloyd Chauncey Brown, San Diego, CA (US)

(73) Assignee: General Atomics, San Diego, CA (US)

( * ) Notice: Subject to any disclaimer, the term of this patent is extended or adjusted under 35 U.S.C. 154(b) by 369 days.

(21) Appl. No.: 13/675,850

(22) Filed: Nov. 13, 2012

(65) Prior Publication Data

US 2014/0133616 A1  May 15, 2014

(51) Int. Cl.
G21G 1/02        (2006.01)
C22B 60/04       (2006.01)
G21G 1/00        (2006.01)
C01G 56/00       (2006.01)

(52) U.S. Cl.
CPC .............. G21G 1/001 (2013.01); C01G 56/006 (2013.01); C22B 60/04 (2013.01); G21G 1/02 (2013.01)

(58) Field of Classification Search
CPC .......... C22B 60/04; G21G 1/00; G21G 1/001; G21G 1/02
USPC ............ 376/158, 170, 182, 341; 75/392, 393, 75/396
See application file for complete search history.

(56) References Cited

U.S. PATENT DOCUMENTS

| 2,785,047 | A |   | 3/1957  | Brown et al.           |
|-----------|---|---|---------|------------------------|
| 2,883,617 | A |   | 5/1958  | Seaborg et al.         |
| 2,838,366 | A | * | 6/1958  | Beaufait ......... 423/14 |
| 2,860,948 | A | * | 11/1958 | Fried ............. 423/19 |
| 2,865,704 | A |   | 12/1958 | Jaffey et al.          |
| 2,869,982 | A |   | 1/1959  | Brown et al.           |
| 2,882,125 | A |   | 4/1959  | Spedding et al.        |
| 2,982,604 | A |   | 4/1961  | Seaborg et al.         |
| 3,046,089 | A | * | 7/1962  | Steindler ......... 423/19 |
| 3,047,360 | A | * | 7/1962  | Sheppard ......... 423/9 |
| 3,080,307 | A |   | 3/1963  | Rinald                 |
| 3,165,376 | A | * | 1/1965  | Golliher ............ 423/6 |
| 3,269,915 | A | * | 8/1966  | Ransohoff et al. ..... 376/170 |
| 3,294,493 | A |   | 12/1966 | Jonke et al.           |

(Continued)

OTHER PUBLICATIONS

Lucas et al., "Designing a New Radioactive Liquid Waste Treatment Facility for Los Alamos National Laboratory to Update Treatment Technologies and Meet Current Regulatory Requirements", WM2008 Conference, Feb. 24-28, 2008, Phoeniz, AZ, 15 pages.*

(Continued)

*Primary Examiner* — Jack W Keith
*Assistant Examiner* — Daniel Wasil
(74) *Attorney, Agent, or Firm* — Jones Day; Jaime D. Choi

(57) ABSTRACT

A method for preparing plutonium-238 (Pu-238) includes using a nuclear reactor in irradiating a liquid containing a neptunium-237 (Np-237) based compound with neutrons to convert a portion of the Np-237 based compound to a Np-238 based compound; retaining the liquid containing the resulting mixture for a sufficient amount of time for the Np-238 based compound to at least partially convert to a Pu-238 based compound; and separating the Pu-238 based compound from the neptunium based compounds using fractional distillation or a chemical separation method.

24 Claims, 7 Drawing Sheets

(56) References Cited

U.S. PATENT DOCUMENTS

| | | | | |
|---|---|---|---|---|
| 3,374,068 | A | * | 3/1968 | Judson et al. .................... 423/4 |
| 3,432,276 | A | * | 3/1969 | Reas ................................. 423/7 |
| 3,595,629 | A | * | 7/1971 | Schulz ............................ 423/10 |
| 3,615,267 | A | * | 10/1971 | Golliher et al. ............... 376/170 |
| 3,787,553 | A | * | 1/1974 | Espie et al. ....................... 423/9 |
| 3,962,401 | A | * | 6/1976 | Tsuboya et al. ................ 423/10 |
| 4,233,267 | A | * | 11/1980 | Coker et al. .................. 422/187 |
| 4,416,855 | A | * | 11/1983 | Abrams et al. ................ 422/111 |
| 5,257,297 | A | * | 10/1993 | Reda et al. .................... 376/158 |
| 5,476,641 | A | * | 12/1995 | Todokoro et al. ................ 423/6 |
| 5,583,900 | A | | 12/1996 | Kasahara et al. |
| 5,585,043 | A | * | 12/1996 | Wada et al. ................... 252/636 |
| 6,136,197 | A | * | 10/2000 | Egorov et al. ................ 210/656 |
| 6,678,344 | B2 | * | 1/2004 | O'Leary et al. .............. 376/170 |
| 6,896,716 | B1 | * | 5/2005 | Jones ............................ 376/182 |
| 2011/0224472 | A1 | | 9/2011 | Denton |
| 2011/0265605 | A1 | * | 11/2011 | Meikrantz et al. .............. 75/396 |
| 2013/0114775 | A1 | * | 5/2013 | Howe et al. ................... 376/182 |

OTHER PUBLICATIONS

Groh et al, "Development and Performance of Processes and Equipment to Recover Neptunium-237 and Plutonium-238", pp. 165-177, WSRC-MS-2000-00061, May 17, 2000.*

Todd et al, "Plutonium-238 Recovery From Irradiated Neptunium Targets Using Solvent Extraction", INL/CON-06-11850, Oct. 2006.*

Bobolea, "A Study of Continuous Electrochemical Processing Operation Feasibility for Spent Nuclear Fuel", Thesis submitted to Graudate Faculty of North Carolina State University, 2009.*

Hyde et al., "The Transuranium Elements," University of California, Radiation Laboratory, Berkeley, CA, pp. 38-77 (1956).

ISA/US, International Search Report for PCT/US2013/067722, mailed Jul. 9, 2014 (2 pages).

ISA/US, Written Opinion for PCT/US2013/067722, mailed Jul. 9, 2014 (9 pages).

Armarego et al., Purification of Laboratory Chemicals, 2009, 6th Edition, pp. 8-14.

Richardson et al., eds., Coulson and Richardson's Chemical Engineering vol. 3 (Chemical & Biochemical Reactors, and Process Control), 3rd Edition, Pergamon Press, Oxford, UK, 1994, p. 34.

Furniss et al., Vogel's Textbook of Practical Organic Chemistry, 5th Edition, Longman Scientific & Technical, Essex, England, 1996, pp. 173-186.

Wakao et al., Heat and Mass Transfer in Packed Beds, Gordon and Breach, Science Publishers, Inc., New York, 1982, pp. xi-xiii.

* cited by examiner

US 9,196,389 B2

SYSTEMS AND METHODS FOR EFFICIENTLY PREPARING PLUTONIUM-238 WITH HIGH ISOTOPIC PURITY

FIELD OF THE INVENTION

This application relates to systems and methods for preparing plutonium-238.

BACKGROUND OF THE INVENTION

Plutonium-238 (Pu-238) has been used as a convenient, compact, long-lasting energy source referred to as a "radioisotope thermoelectric generator" (RTG). Specifically, Pu-238 is a plutonium isotope that has a half-life of approximately 88 years. Pu-238 spontaneously decays to form alpha particles and uranium-234, also referred to as U-234, which then decays further along the radium series to lead-206. Pu-238's decay also generates heat that may be converted into electrical power at a rate of 0.5 W per gram of Pu-238. Because of Pu-238 has a half life that is sufficiently short to generate a useful amount of power, and is sufficiently long to provide that power to a device for a useful amount of time, Pu-238 is a particularly desirable energy source for spacecraft and satellites, among other types of devices.

However, Pu-238 is not a naturally occurring isotope of plutonium, and therefore must be synthesized. The United States performed a great deal of research between the 1940's and the 1960's into chemical and/or physical methods of separating fission reactor products, e.g., plutonium, uranium, neptunium, and fission products, from one another. A relatively small number of methods employed volatility, see, for example, U.S. Pat. No. 2,785,047 to Brown et al., U.S. Pat. No. 2,833,617 to Seaborg et al., U.S. Pat. No. 2,865,704 to Jaffey et al., U.S. Pat. No. 2,882,125 to Spedding et al., and U.S. Pat. No. 3,294,493 to Jonke et al. One method, U.S. Pat. No. 2,869,982 to Brown et al., employed fractional distillation to separate plutonium from uranium. However, such chemical and/or distillation-based methods may not satisfactorily separate particular isotopes of a given element from one another. For example, if the fission reactor products contain both Pu-238 and its heavier isotope Pu-239, the two isotopes may not readily be separable from one another using chemistry and/or distillation. Pure Pu-238 may only reasonably be obtained by a method in which Pu-239 and Pu-238 are not admixed with one another.

Interest in preparing Pu-238 recently has revived because of the isotope's suitability for use in RTG's for use in spacecraft. For example, U.S. Pat. No. 6,896,716 to Jones discloses that schemes are known for producing Pu-238 by irradiating a neptunium-237 (Np-237) target with thermal neutrons in a nuclear reactor. Specifically, Jones discloses that such irradiation of an Np-237 target produces Np-238, which decays via β-decay into Pu-238 with a half life of 2.12 days. Jones points out that such a scheme may result in generation of both higher and lower isotopes of plutonium. For example, Jones discloses that the Pu-238 produced in the target itself becomes a target for producing higher plutonium isotopes, such as Pu-239 and Pu-240. Jones also discloses that fast neutrons may cause Np-237 to decay to form uranium-236 (U-236) and Pu-236, the latter decaying to U-232, which has a hazardous gamma-ray emitting daughter product. Jones is directed toward an alternative method of producing Pu-238 that is based on irradiating targets of a stable oxide of americium-241 (Am-241), with a high thermal neutron flux within a reactor. Jones discloses that after 20-30 days, the Am-241 is converted to curium-242 (Cm-242), which then promptly must be chemically separated, preferably within 10-20 days. The Cm-242, which has a half-life of 163 days, decays to Pu-238.

Although Jones states that the Am-241 based method is capable of preparing Pu-238 with a purity of about 95%, it is clear that the process is relatively time-consuming and includes several cumbersome steps. For example, the targets must be physically inserted into and removed from a nuclear reactor on a fixed schedule, must promptly be chemically treated, and the resulting reaction products must be allowed to decay over a period of several months to obtain Pu-238. The shortcomings of the previously known Np-237 based method are also clear, including similar requirements for inserting and removing the targets from a nuclear reactor, and likely production of one or several other plutonium isotopes besides Pu-238. Separating such isotopes from one another may be difficult. In this regard, it should be noted that each plutonium isotope produced other than Pu-238 reduces the overall yield of Pu-238, thus reducing the power that the material may generate.

Notwithstanding the methods that Jones describes, it is not believed that any production facilities for Pu-238 presently exist anywhere in the world. Although some Pu-238 has been previously produced and stored, primarily using the previously known Np-237 based method, the present supply of Pu-238 is believed to be fixed and is being consumed at such a rate that Pu-238 may not be available for RTGs to power future spacecraft and satellites.

Thus, what is needed is a practicable, efficient, low-cost, and rapid method of preparing Pu-238 with high isotopic purity.

SUMMARY OF THE INVENTION

Embodiments of the present invention provide systems and methods for efficiently preparing plutonium-238 (Pu-238) with high isotopic purity, that is, with relatively low amounts of other plutonium isotopes. Specifically, such high-purity Pu-238 may be prepared by providing a system and method that limits the extent to which undesirable side reactions may occur by exposing Np-237 to thermal neutrons, so as to produce Np-238 that decays to Pu-238, in a manner that significantly limits the time with which the Np-237 is exposed to neutrons. As such, the likelihood may significantly be reduced that Np-237 and its desired products, Np-238 and Pu-238, may react with fast neutrons or with additional thermal neutrons and thus generate undesired products. Preferably, the systems and methods of the present invention achieve such an effect by maintaining the Np-237 and its desired products, Np-238 and Pu-238 in liquid form, the exposure of which to thermal neutrons may be carefully controlled by adjusting the flow rate thereof.

Under one aspect of the present invention, a system for preparing plutonium-238 (Pu-238) using neutrons emitted by a nuclear reactor includes an irradiation unit configured to receive a liquid comprising a neptunium-237 (Np-237) based compound and to receive the neutrons emitted by the nuclear reactor such that the neutrons convert a portion of the Np-237 based compound to a neptunium-238 (Np-238) based compound, resulting in a liquid containing a mixture of the Np-237 based compound and a relatively small amount of the Np-238 based compound. The system also may include a decay unit configured to retain the resulting mixture from the irradiation unit for a sufficient amount of time for the Np-238 based compound in the liquid to at least partially, and preferably almost completely convert to a plutonium-238 (Pu-238) based compound, resulting in a liquid comprising a mixture of the Np-237 based compound, the Np-238 based compound, and the Pu-238 based compound. The system further may include a separation unit including a vessel configured to heat the resulting mixture from the decay unit to a temperature at the boiling point of the liquid mixture so as to form a vapor which is either enriched or depleted in the Pu-238 based compound relative to the Np-237 based compound, and a condensation system which is configured to collect that vapor. Preferably, the separation unit comprises a fractional distillation apparatus that includes a heated vessel at the bottom, and a distillation column equipped with suitable trays or packing. The condensation system may reflux a portion of the condensed vapor down the distillation column, and may condense the remaining vapor as a separated liquid product. Alternatively, another form of separation such as solvent extraction, fractional crystallization, or chromatography may be used.

In some embodiments, the irradiation unit includes a plurality of panels each positioned adjacent the nuclear reactor and configured to receive the liquid comprising the Np-237 based compound. The system may include pipes connecting the panels in parallel with one another. In some embodiments, the nuclear reactor and at least a portion of the irradiation unit are disposed within a common pool.

In some embodiments, the decay unit includes a plurality of retention tanks configured to receive the liquid comprising the mixture of the Np-237 based compound and the Np-238 based compound. In one exemplary embodiment, the decay unit includes a single retention tank containing packing to minimize back mixing of the liquid. The system may include pipes connecting the retention tanks in series with one another.

In some embodiments, the separation unit includes a conduit and a condenser, the conduit configured to condense that vapor into a liquid and to transport the condensed liquid to the separation unit. In one example, the vapor may include the Np-237 based compound and the condenser may be configured to condense that vapor into a liquid comprising the Np-237 based compound. The system may include a pipe connecting the condenser to the irradiation unit so as to return the condensed liquid comprising the Np-237 based compound to the irradiation unit.

In one illustrative embodiment, the Np-237 based compound is neptunium-237 hexafluoride, the Np-238 based compound is neptunium-238 hexafluoride, and the Pu-238 based compound is plutonium-238 hexafluoride.

Under another aspect of the present invention, a method for preparing plutonium-238 (Pu-238) using neutrons emitted by a nuclear reactor includes irradiating a flow of a liquid comprising a neptunium-237 (Np-237) based compound with the neutrons emitted by the nuclear reactor such that the neutrons convert a portion of the Np-237 based compound to a neptunium-238 (Np-238) based compound, resulting in a liquid comprising a mixture of the Np-237 based compound and a relatively small amount of the Np-238 based compound. The method also may include retaining the resulting mixture for a sufficient amount of time for the Np-238 based compound to at least partially and preferably almost completely convert to a plutonium-238 (Pu-238) based compound, resulting in a liquid comprising a mixture of the Np-237 based compound, the Np-238 based compound, and the Pu-238 based compound. The method further may include heating the resulting mixture to a temperature at a boiling point of the mixture so as to form a vapor which is either enriched or depleted in the Pu-238 based compound relative to the Np-237 based compound, and collecting that vapor.

DETAILED DESCRIPTION

Embodiments of the present invention provide systems and methods for efficiently preparing plutonium-238 (Pu-238) with high isotopic purity, that is, with relatively low amounts of other plutonium isotopes. Specifically, embodiments of the present invention produce Pu-238 based on liquid-phase processing of neptunium-237 (Np-237) based compounds, rather than solid-phase processing as was previously known, e.g., as described by Jones. The liquid-phase processing begins by providing a liquid that includes a soluble, chemically stable compound of Np-237, such as neptunium hexafluoride ($^{237}NpF_6$). The liquid including the Np-237 based compound is transported through an irradiation unit located near a nuclear reactor, which irradiates the liquid with thermal neutrons, which converts a portion of the Np-237 based compound into a neptunium-238 analog of the same compound, such as Np-238 hexafluoride ($^{238}NpF_6$), that preferably also is soluble in the liquid. The resulting mixture then is transported through a decay unit that is located away from, or shielded from, the nuclear reactor, so as to inhibit further neutron irradiation of the mixture. The Np-238 based compound in the liquid at least partially decays in the decay unit to a plutonium-238 analog of that compound, such as Pu-238 hexafluoride ($^{238}PuF_6$), that preferably also is soluble in the liquid. The resulting mixture is then transported to a separation unit, where the neptunium and plutonium analogs of the compound may be at least partially separated from one another by distillation or other suitable method. Preferably, the flow rate of the liquid past the reactor and through the decay tanks is selected to provide satisfactory rates of conversion of the Np-237 based compound to the Np-238 based compound and from there to the Pu-238 based compound, while reducing the risk that undesired reaction products, including other plutonium isotopes, will be formed. Following separation, any remaining Np-237 or Np-238 based compounds may be recirculated through the irradiation, decay, and separation units for production of additional Pu-238 based compound.

First, an exemplary system configured for use in producing Pu-238 will be described. Then, an exemplary method for producing Pu-238 will be described. Lastly, the expected isotopic purity of the Pu-238 produced using the inventive systems and methods will be compared to the expected isotopic purity of Pu-238 produced previously known, solid-state Np-237 based systems and methods.

Figure 1:
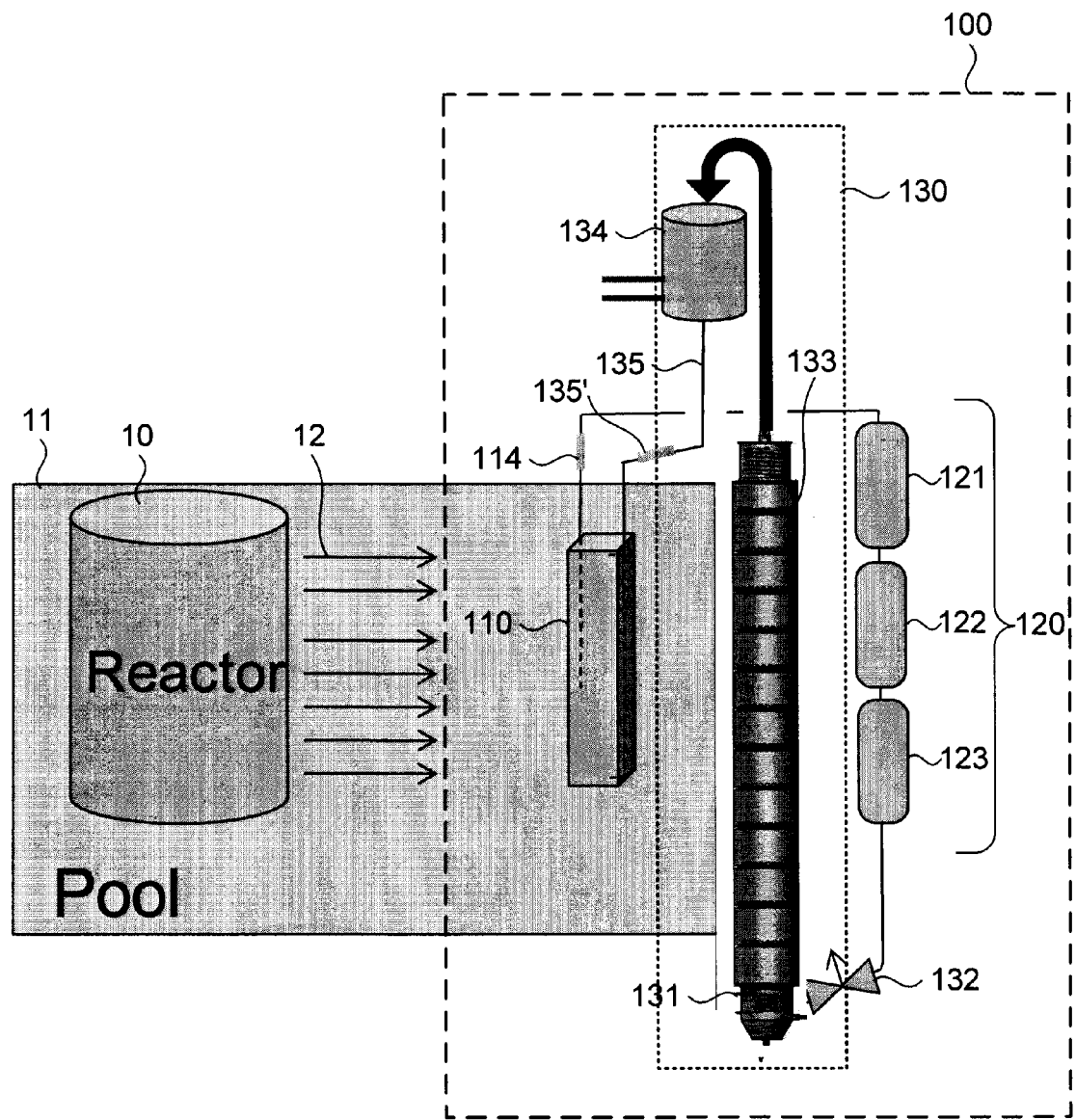
FIG. 1 illustrates a high-level schematic overview of a system for preparing plutonium-238 in conjunction with a pre-existing nuclear reactor, according to some embodiments of the present invention.

FIG. 1 illustrates a high-level schematic overview of system 100 for producing Pu-238 in conjunction with a pre-existing nuclear reactor 10, according to some embodiments of the invention. System 100 includes irradiation unit 110, decay unit 120 coupled to irradiation unit, and separation unit 130 coupled both to irradiation unit 110 and decay unit 120 so as to define a partially closed-loop fluidic control system.

Fission nuclear reactor 10, which may be immersed in water pool 11, emits thermal neutrons 12 having a kinetic energy and a flux. As is known to those skilled in the art, fission nuclear reactors may emit "fast" neutrons having kinetic energies on the order of 1-2 MeV as a fission product, which may be converted to "thermal" neutrons having kinetic energies on the order of 0.01 to 0.04 eV, e.g., around 0.025 eV, by using a neutron moderator such as heavy or light water, or graphite. Preferably, thermal neutrons 12 have a kinetic energy suitable to fuse to the nucleus of Np-237 so as to produce Np-238.

Irradiation unit 110 of system 100 is disposed adjacent to reactor 10, and preferably within a common pool 11 as reactor 10. Irradiation unit 110 is configured to receive a flow of liquid that includes a Np-237 based compound, as well as to receive thermal neutrons from the reactor such that the neutrons convert a relatively small portion of the Np-237 based compound to a Np-238 based compound, e.g., a Np-238 based analog of the Np-237 based compound. In some embodiments, the resulting mixture contains about 10% or less of the Np-238 based compound and about 90% or more of the Np-237 based compound, or about 5% or less of the Np-238 based compound and about 95% or more of the Np-237 based compound, or about 1% or less of the Np-238 based compound and about 99% or more of the Np-237 based compound, or even about 0.1% or less of the Np-238 based compound and about 99.9% or more of the Np-237 based compound.

Preferably, irradiation unit 110 and reactor 10 are configured so as to reduce or minimize the flux of fast neutrons that irradiate the liquid. Specifically, as noted above and as is known in the art, fast neutrons may cause Np-237 to decay to Np-236, which decays to U-236 and Pu-236, which not only may reduce the overall yield of Pu-238 but also may produce hazardous decay products. As such, irradiation unit 110, reactor 10, and common pool 11 preferably are configured so as to reduce the flux of fast neutrons received by the liquid, e.g., by providing a sufficiently thick neutron moderator between irradiation unit 110 and reactor 10. In some embodiments, common pool 11 performs the function of such a neutron moderator. In an alternative embodiment (not illustrated), irradiation unit 110 may be disposed within reactor 10, preferably including a neutron moderator to reduce irradiation of the liquid therein to fast neutrons.

As neutrons 12 produce the Np-238 based compound, preferably that compound is readily soluble in the liquid and mixes with the Np-237 based compound. The resulting liquid mixture may flow through irradiation unit 110 under the action of a pump (not illustrated) or preferably under the action of pressure generated in separation unit 130, described below. Additionally, note that irradiation unit 110 may include a heater (not shown) to maintain the liquid at a pre-defined temperature, e.g., a temperature at which compounds in the mixture remain in the liquid phase and/or soluble in the liquid, so as to ensure flowability of the liquid. Preferably, the Np-237 and the Np-238 based compounds are analogs of one another; that is, the chemical compositions of the compounds preferably differ only with respect to the nuclear isotope therein. As such, in preferred embodiments, neutrons 12 may cause no physical or chemical change to the Np-237 based compound other than converting the Np-237 atoms therein to Np-238 atoms. In one nonlimiting example, the Np-237 based compound is $^{237}NpF_6$ and the Np-238 based compound is $^{238}NpF_6$.

The flow rate of the liquid mixture may be selected based both on the flux of neutrons 12 from reactor 10 and on the half-life of Np-238. Specifically, as neutrons 12 convert a portion of the Np-237 based compound to the Np-238 based compound, the Np-238 atoms in the Np-238 based compound may begin to decay with a well-characterized half life to Pu-238 atoms. However, the greater the flux of neutrons 12, and the longer the Pu-238 atoms remain near reactor 10, the greater the likelihood that neutrons 12 may convert the Pu-238 atoms of the Pu-238 based compound to higher plutonium isotopes, such as plutonium-239 (Pu-239) or plutonium-240 (Pu-240). As noted above and as is familiar to those skilled in the art, different plutonium isotopes may be difficult to separate from one another; accordingly, any Pu-238 that is converted to a different plutonium isotope lowers the overall yield of production of Pu-238 and dilutes it with undesirable isotopes. Moreover, such other isotopes themselves may decay into undesirable products, as noted above. Given a fixed irradiation volume and neutron flux, increasing the flow rate through irradiation unit 110 may reduce the concentration of Pu-238 based compound in the volume of liquid irradiated, but not the rate of the formation of the Pu-238 based compound, so the rate of conversion of Pu-238 based compound to Pu-239 based compound may decrease and thus the product purity may improve. Additionally, increasing the volumes in the non-irradiation portions of system 10 for a given flow rate may result in more decay of Np-238 based compound to Pu-238 based compound, thus increasing the yield of Pu-238 based compound and decreasing the concentration of Np-238 based compound in the liquid that is returned to irradiation unit 110, described in greater detail below, so as to reduce the amount of Pu-239 based compound that is formed. Additionally, increasing the efficiency of separation system 130 may decrease the amount of Pu-238 based compound that is returned to irradiation unit 110, described below, and thus reduce the amount of Pu-239 based compound formed and thus increase product purity and yield of the Pu-238 based compound.

Irradiation unit 110 is coupled to decay unit 120 via appropriately configured pipes, optionally including flexible coupling 114. As illustrated in FIG. 1, decay unit 120 may include a plurality of retention tanks 121, 122, 123 that are connected in series with one another by appropriate pipes (not labeled). Alternatively, the decay unit is a packed vessel configured to receive the liquid mixture of the Np-237 based compound and the Np-238 based compound and transport the liquid through the vessel in essentially plug flow. In either embodiment, decay unit 120 is configured to receive a flow of the mixture of the Np-237 based liquid and the Np-238 based liquid from irradiation unit 110, e.g., by first receiving the mixture of liquids in retention tank 121, then in retention tank 122, and then in retention tank 123. Decay unit 120 is configured to retain the mixture for a sufficient amount of time for a majority of the Np-238 to convert to a Pu-238. Specifically, the Np-238 atoms in the liquid may spontaneously decay to Pu-238 with a half-life of 2.1 days. The volume of liquid that decay unit 120 may hold, and the flow rate of that liquid therethrough, preferably are selected such that some or all of the Np-238 based compound in the liquid converts to Pu-238 based compound within decay unit 120, the result being a liquid including a mixture of the Np-237 based compound, and relatively small amounts of the Np-238 based compound and the newly produced Pu-238 based compound. In one illustrative embodiment, the flow rate of liquid through decay unit 120 is selected such that, given the overall volume of system 100, the liquid spends greater than one Np-238 half life outside of irradiation unit 110, e.g., greater than 1.5 Np-238 half lives outside of irradiation unit 110, or greater than 2.0 Np-238 half lives outside of irradiation unit 110.

It will be appreciated that some residual Np-238 based compound may remain in the mixture even for holding times that are multiples of the half-life of Np-238. Additionally, it should be noted that decay unit 120 may receive from irradiation unit 110 a liquid containing a mixture of Np-237 based compound, Np-238 based compound, and Pu-238 based compound, but also small amounts of compounds containing other isotopes, including higher neptunium and plutonium isotopes formed by activation and spontaneous decay of the Np-238 based compound within irradiation unit 110 to form Pu-238 based compound, which then reacts with neutrons to form Pu-239 based compound or Pu-240 based compound, which themselves may decay. However, as described further below with reference to FIG. 6, the present systems and methods may significantly reduce formation of plutonium isotopes other than Pu-238 as compared to previously known methods.

Preferably, the Np-237 based compound, the Np-238 based compound, and the Pu-238 based compound are of similar chemical form to one another and form a mutually soluble liquid mixture; that is, the chemical compositions of the compounds preferably differ only with respect to the nuclear isotope therein. As such, in preferred embodiments, substantially no physical or chemical change to the Np-237 based compound occurs within irradiation unit 110 other than conversion of a portion of the Np-238 atoms contained therein to Pu-238 atoms. In one nonlimiting example, the Np-237 based compound may be $^{237}NpF_6$, the Np-238 based compound may be $^{238}NpF_6$, and the Pu-238 based compound may be $^{238}PuF_6$ or possibly $^{238}PuF_4$. Note that at all points within decay unit 120, a liquid mixture of all three of the compounds may be present, as the $^{238}NpF_6$ gradually converts to $^{238}PuF_6$. The liquid mixture may flow through decay unit 120 under the action of gravity, a pump (not illustrated), and/or under the action of positive pressure generated in separation unit 130, described below. Additionally, note that decay unit 120 may include a heater (not shown) to maintain the liquid mixture at a predefined temperature, e.g., a temperature at which the liquid remains in the liquid phase, so as to ensure flowability.

Decay unit 120 is coupled to separation unit 130 via appropriate pipes (not labeled). In some embodiments, separation unit 130 includes vessel 131 coupled to a heater (not illustrated), distillation column 133, condenser 134, recirculation pipe 135 with flexible coupling 135', and inlet valve 132. Vessel 131 is configured to receive a flow of the liquid containing the Np-237 based compound, the Np-238 based compound, and the Pu-238 based compound from decay unit 120. The heater (not illustrated) is coupled to vessel 131, and is configured to heat the received liquid to its boiling point so as to cause volatile components in that liquid to become a vapor. The vapor travels upwards through distillation column 133, which effectuates separation of the more volatile components of the vapor (e.g., the neptunium based compounds) from the less volatile components of the vapor (e.g., the plutonium based compound(s)); the more volatile components are then transported to condenser 134. In preferred embodiments, the plutonium-238 based compound (e.g., $^{238}PuF_6$ or $^{238}PuF_4$) substantially remain in vessel 131, while vapors are condensed within condenser 134 into a liquid that includes, or even consists essentially of, neptunium based compound (e.g., $^{237}NpF_6$ and any remaining $^{238}NpF_6$). The plutonium-238 based compound that remain within vessel 131 may be collected using outlet 136, which may include a suitably configured valve coupled to a collection vessel (not illustrated) that stores the for later use. Condenser 134 may be coupled to irradiation unit 110 via recirculation pipe 135 and flexible coupling 135' so as recirculate the condensed liquid to irradiation unit 110 for use in preparing additional Pu-238 in the manner described herein. In some embodiments, generation of the vapor within distillation unit 130 generates sufficient pressure to cause liquid to flow at the desired flow rate through the remainder of system 100, with the flow controlled using a throttle valve (132) or similar device.

In alternative embodiments, the vapor contains the Pu-238 based compound, and condenser 134 may be configured to condense the vapor into a liquid containing, or consisting essentially of, the Pu-238 based compound. In such embodiments, condenser 134 may be coupled via an appropriate pipe to a collection vessel (not illustrated) configured to store the Pu-238 based compound for later use. The Np-237 and Np-238 based compounds preferably remain within vessel 131 and may be recirculated to irradiation unit 110 via outlet 136 and an appropriate pipe (not illustrated) for use in preparing additional Pu-238 in the manner described herein.

Note that system 100 may be sized to accommodate any suitable volume of liquid. In one embodiment, the components of system 100 hold between about 1 gallon and 50 gallons of liquid, e.g., between about 5 gallons and 25 gallons, or between about 10 gallons and 20 gallons, e.g., 12-15 gallons.

Further details of selected components in system 100 now will be described with reference to FIGS. 2 and 3A-3D.

Figure 2:
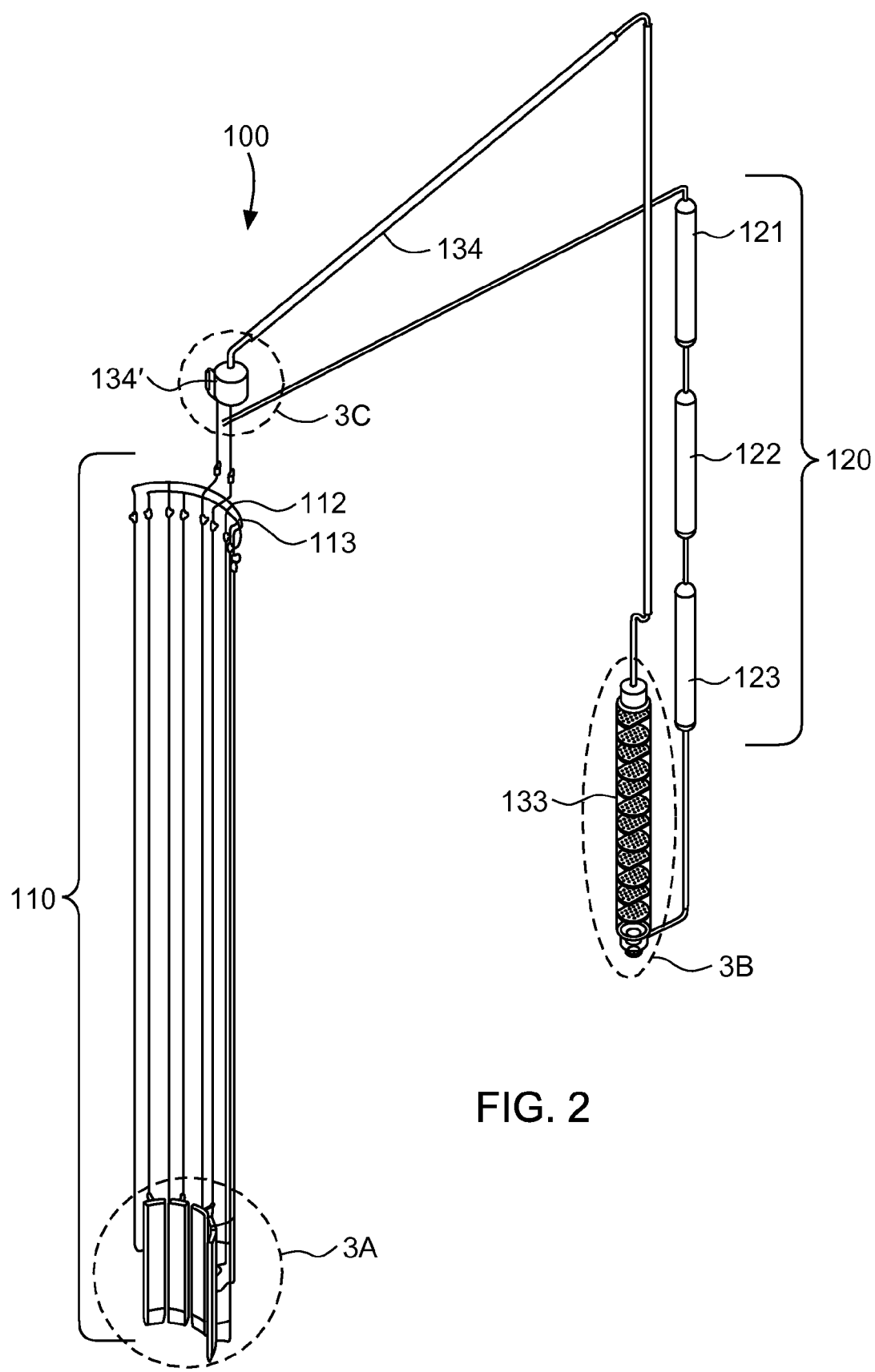
FIG. 2 illustrates a perspective view of the system of FIG. 1.
Figure 3A:
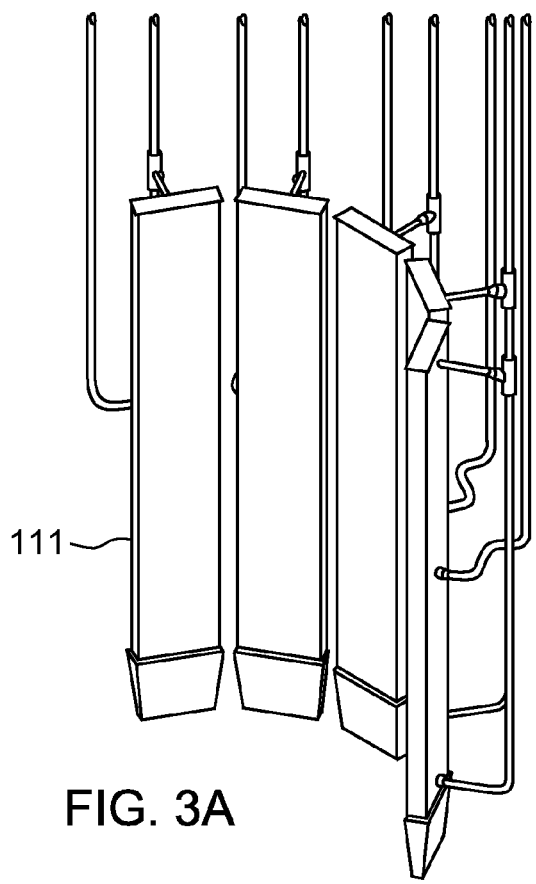
FIGS. 3A-3D illustrate perspective views of additional details of components of the system of FIGS. 1-2.

Specifically, FIG. 2 illustrates a perspective view of one particular embodiment system 100, with pipes (not labeled) coupling the various components of irradiation unit 110, decay unit 120, and separation unit 130. FIG. 3A illustrates in greater detail the portion of irradiation unit 110 designated "3A" in FIG. 2. It may be seen in FIGS. 2 and 3A that irradiation unit 110 may include a plurality of panels 111, e.g., five panels in the illustrated embodiment, that are connected in parallel with one another by a plurality of pipes. Specifically, irradiation unit 110 may include a first manifold 112 configured to divide and respectively route portions of the liquid received from separation unit 130 into each panel 111. Panels 111 may be generally rectangular, and may be arranged in a generally arcuate configuration relative to reactor 10, so as enhance the surface area with which the liquid is exposed to neutrons 12 (reactor 10 and neutrons 12 not shown in FIG. 2), and thus to enhance conversion of the Np-237 based compound in that liquid to Np-238. Irradiation unit 110 also may include a second manifold 113 configured to receive liquid from each panel 111, e.g., a liquid containing a mixture of Np-237 based compound and Np-238 based compound, and to route the liquid to a common pipe for transport to decay unit 120. In some embodiments, the liquid containing the Np-237 based compound is introduced to panels 111 at the top and the bottom of each panel, and is collected near the middle of each panel. Because the flux of neutrons 12 is expected to be highest near the middle of each panel, such a configuration may reduce the amount of time with which any Np-238 based compound or Pu-238 based compound generated therefrom is exposed to additional neutron flux.

Note that panels 111 may have any suitable shape, and may be provided in any suitable number, to effect radiation of the liquid therein with thermal neutrons 12 from reactor 10. For example, panels 111 may be shaped as tubes, spheres, cubes, and the like, and there may be one, two, three, four, five, six, seven, eight, nine, ten, or more than ten such panels provided.

As illustrated in FIG. 2, decay unit 120 includes first retention tank 121 coupled in series with second retention tank 122, which is coupled in series with third retention tank 123, via appropriate pipes. In the illustrated embodiment, retention tanks 121, 122, and 123 are generally cylindrical with rounded ends, and may be oriented generally vertically relative to one another such that the liquid containing the mixture of Np-237 based compound and Np-238 based compound, as well as any reaction products that may be suspended or dissolved therein (including any solid-state reaction products), flows downward therethrough under the force of gravity. It should be appreciated that any suitable number of retention tanks may be used (including a single retention tank or other vessel, including a single pipe), and that such tanks have any suitable shape and may be oriented in any appropriate configuration. In some embodiments, retention tanks 121, 122, and 123 are sized such that the liquid resides therein for about 10-40 hours, e.g., about 20-30 hours, or about 22-25 hours. Preferably, a majority (e.g., greater than 50%) of the Np-238 based compound converts to the Pu-238 based compound before the liquid arrives at separation unit 130. For example, greater than 60%, greater than 70%, greater than 80%, or even greater than 90% of the Np-238 based compound may convert to the Pu-238 based compound before the liquid arrives at separation unit 130. In one embodiment, retention tanks 121, 122, and 123 are sized such that the liquid spends a total of at least 1.5 half lives of Np-238 outside of irradiation unit 110.

Figure 3B:
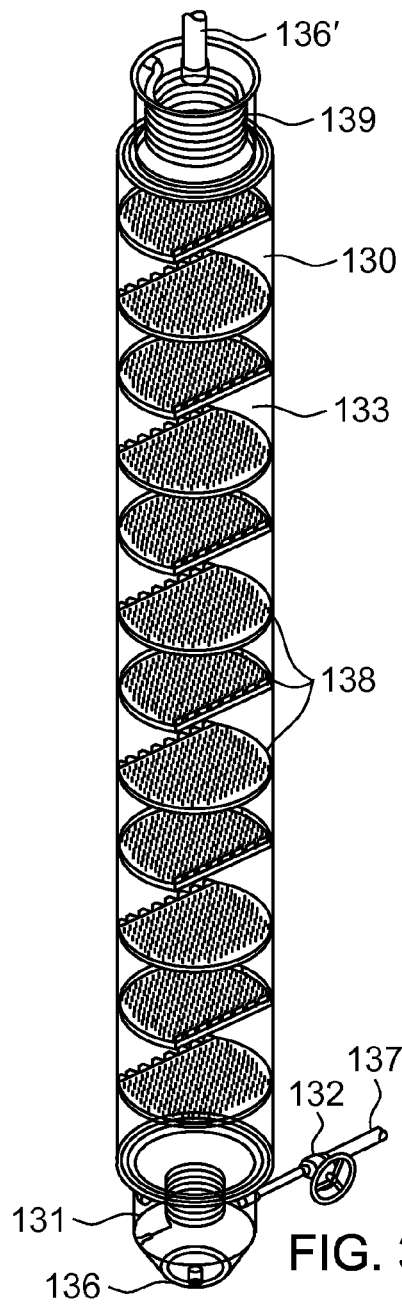

FIG. 3B illustrates in greater detail the portion of separation unit 130 designated "3B" in FIG. 2. It may be seen that separation unit 130 includes vessel 131, coupled to inlet 137 configured to receive the liquid containing the mixture of the Np-237 based compound, the Np-238 based compound, and the Pu-238 based compound from third retention tank 123 of decay unit 120 via inlet 137 and inlet valve 132. Such liquid may be provided as a continuous flow, or alternatively may be provided in discrete, discontinuous batches.

Figure 7:
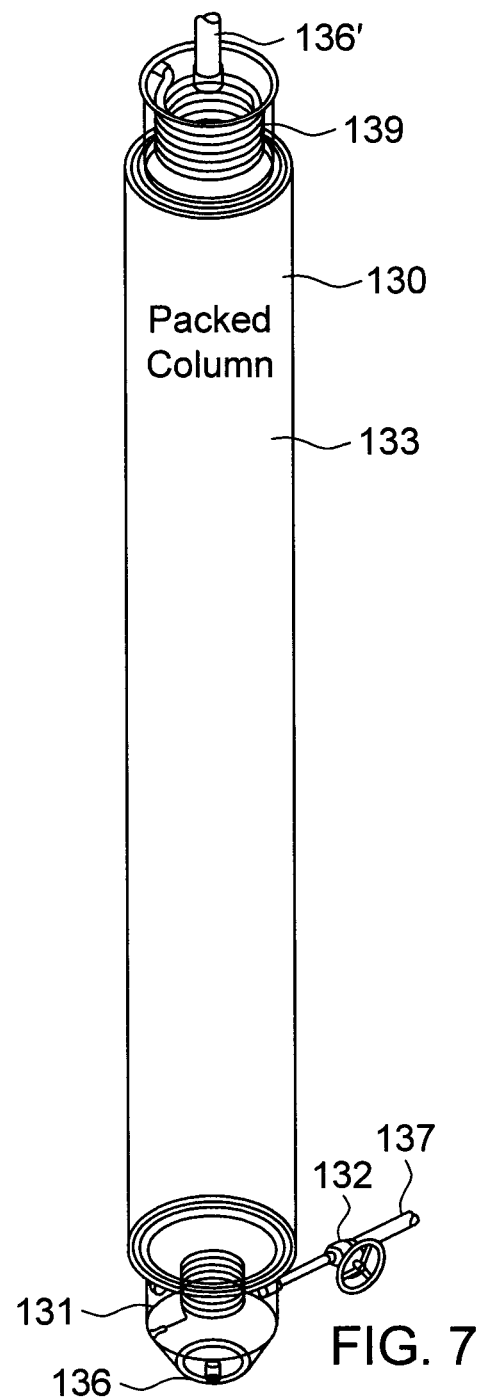
FIG. 7 illustrates a packed column.

In preferred embodiments, vessel 131 is coupled to distillation column 133 such that, when the liquid is heated by a heater (not illustrated in FIG. 3B) at the boiling point of the liquid, more volatile components of the liquid may preferentially be separated from the less volatile components in the liquid by distillation. For example, distillation column 133 may include a plurality of porous distillation plates 138 that facilitate separation of the more volatile components of the liquid, e.g., the Np-237 and Np-238 based compounds, from the less volatile components of the liquid, e.g., the Pu-238 based compound(s). Specifically, as is familiar to those skilled in the art, distillation plates 138 may facilitate separation of more volatile components of a liquid mixture from less volatile components of that liquid mixture by providing surfaces upon which the less volatile components preferentially may condense relative to the more volatile components, thus preferentially enriching the vapor phase with the more volatile components. Those skilled in the art will appreciate that the more distillation plates 138 provided, the more volatile components of a liquid mixture may be preferentially distilled with greater purity. In some embodiments, distillation column includes 10 or more, or 50 or more, or 100 or more, or 500 or more, or even 1000 or more distillation plates 138. Given the teachings herein, those skilled in the art may suitably select an appropriate number of distillation plates 138 for use in separating a Pu-238 based compound from an Np-237 based compound and an Np-238 based compound. Likewise, those skilled in the art will appreciate that the number of plates needed will depend upon the type of plate selected (e.g., bubble cap tray, valve tray, or sieve tray) and that a suitable length of random or structured packing may substitute for the plates. In one embodiment, distillation column 133 is configured as a packed column such as illustrated in FIG. 7.

In some embodiments, the vapor is preferentially enriched in the Np-237 and Np-238 based compounds relative to the residual liquid in vessel 131, while in other embodiments, the vapor is preferentially enriched in the Pu-238 based compound relative to the residual liquid in vessel 131, so as to separate the neptunium based compounds from the Pu-238 based compound. Less volatile compounds that reach the top of distillation column 133 preferably condense at reflux head 139, which is cooled relative to distillation column 133, and such compounds then preferably reflux back to vessel 131 for further separation. Any other suitable structure or method that facilitates separation of the Np-237 and Np-238 based compounds from the Pu-238 based compound may be used. Vessel 131 includes first outlet 136 through the less volatile components may be removed, e.g., the Pu-238 based compound, and second outlet 136' through which the more volatile components may be removed, e.g., the Np-237 based compound and the Np-238 based compound. It will be appreciated that, depending on the properties of the particular chemical compounds being used, in some circumstances the Pu-238 based compound may be the more volatile component and the neptunium based compounds may be the less volatile components of the liquid introduced to separation unit 130.

Preferably, the liquid input to vessel separation unit 130 has a substantially continuous flow, so that the relative proportion of the neptunium and Pu-238 based compounds at any given point within separation unit 130, particularly at each of distillation plates 138, is substantially at equilibrium. The vapor containing the more volatile components of the liquid, e.g., the neptunium based compounds, may be removed substantially continually via second outlet 136', which is connected to condenser 134 described in greater detail below with reference to FIG. 3C. However, the liquid that remains in vessel 131 need not necessarily be removed continually via outlet 136. Instead, the liquid may be allowed to accumulate in vessel 131 over a period of time, e.g., over hours, weeks, days, months, or years, and then removed as a single batch. In one illustrative embodiment, the liquid is removed once per annual quarter, e.g., every three months. Although such accumulation may gradually change the relative proportions of the neptunium based compounds and the Pu-238 based compound(s), at any given moment in time the relative proportions of these compounds at any given point within separation unit 130 is substantially at equilibrium.

Figure 3C:
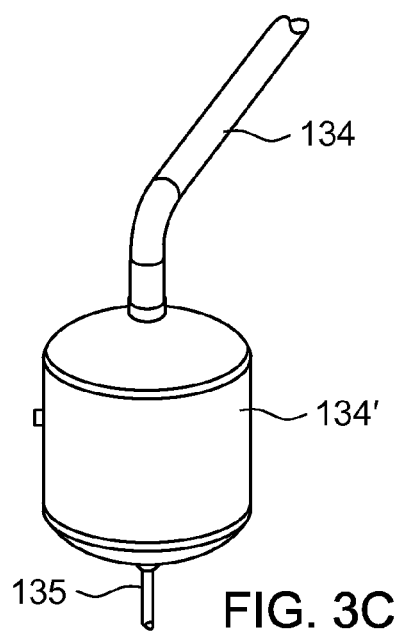

FIG. 3C illustrates the portion of separation unit 130 that includes condenser 134, and is designated "3C" in FIG. 2. Condenser 134 includes a cooling unit (not shown) through which flows a fluid having a temperature below the boiling point of the vapor, e.g., below the boiling point of the neptunium based compounds or of the Pu-238 based compound(s). The vapor thus condenses onto the surface of the cooling unit and transitions the vapor back into a liquid containing either the neptunium based compound or the Pu-238 based compound, which may be recirculated to irradiation unit 110 via a holding tank 134' and conduit 135.

Figure 3D:
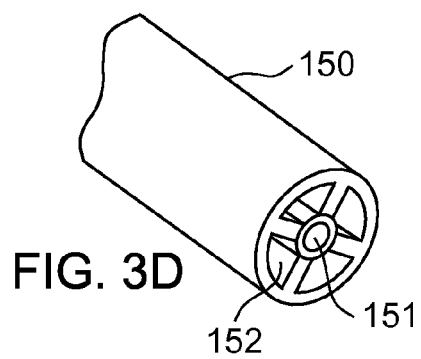

Preferably, the pipes (also referred to as conduits) that interconnect irradiation unit 110, decay unit 120, and separation unit 130 are configured to maintain the liquid therein at an appropriate temperature to maintain flowability of that liquid. FIG. 3D illustrates a perspective view of a selected cross-section of exemplary pipe 150 that suitably may be used to interconnect one or more components of system 100. Pipe 150 may be seen to include central passageway 151 configured to receive the liquid, as well as a plurality of peripheral passageways 152 positioned about central passageway 151 and configured to maintain a partial vacuum about the central passageway, e.g., under action of a vacuum connected thereto (not illustrated). A heater, such as a strip heater (not shown), may be disposed on the outer surface of pipe 150 so as to maintain any liquid flowing therethrough in a liquid state. Additionally, it will be appreciated that pipes 150, irradiation unit 110, decay unit 120, and separation unit 130 preferably are constructed of a material selected so as to substantially resist chemical reaction with the liquid or vapor therein, including any anticipated byproducts thereof. Such materials will be familiar to those skilled in the art.

Figure 4:
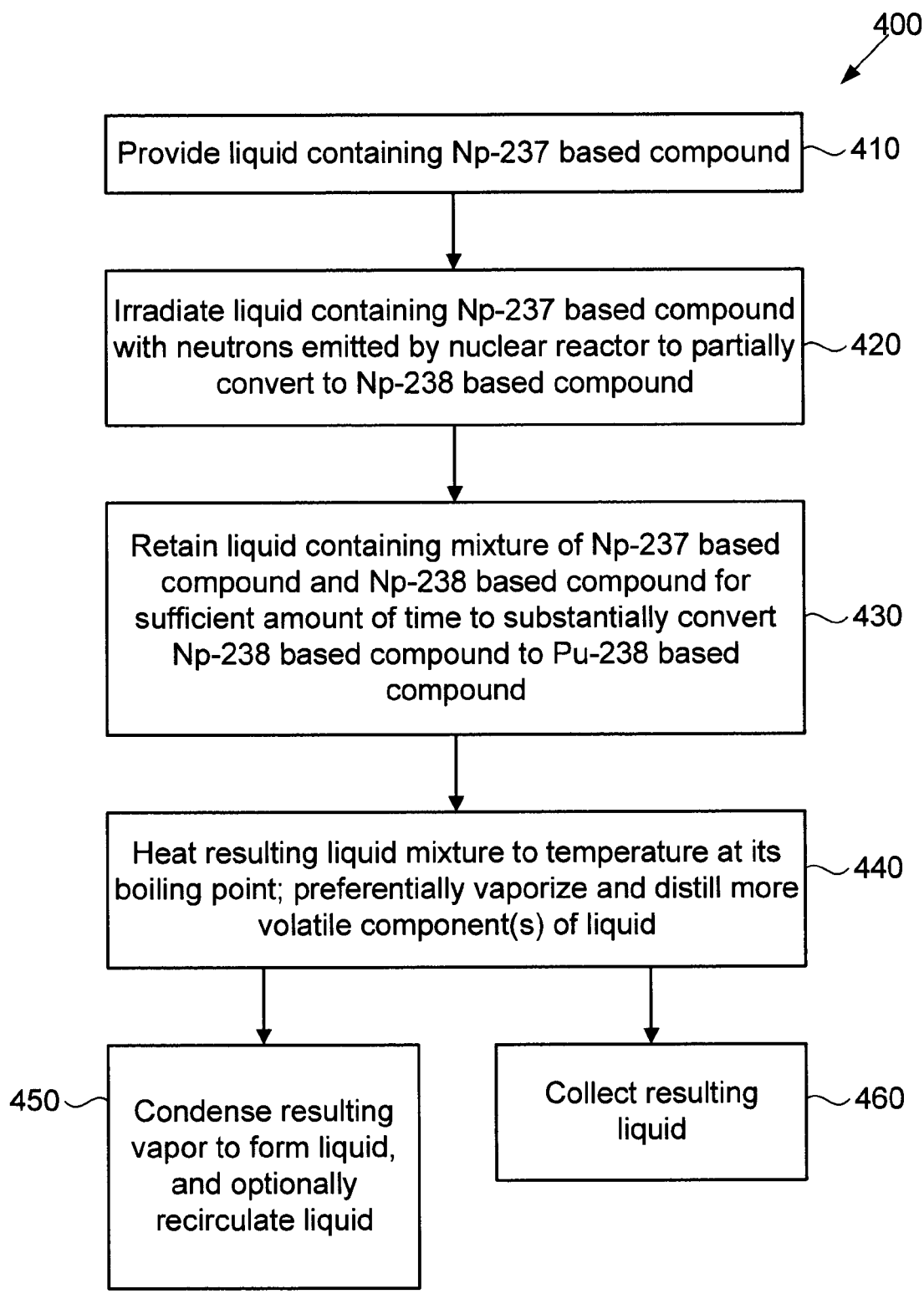
FIG. 4 illustrates a method for preparing plutonium-238, according to some embodiments of the present invention.

FIG. 4 illustrates steps in a method of preparing Pu-238, e.g., using system 100 described above with reference to FIGS. 1-3D. It will be understood that systems having configurations other than that illustrated in FIGS. 1-3D suitably may be used to implement the inventive method.

Method 400 begins with providing a liquid containing a Np-237 based compound (step 410). In some embodiments, the liquid consists essentially of the Np-237 compound, although relatively small amounts of Np-238 or Pu-238 also may be present if the liquid is obtained by recirculating liquid that has already been processed using the steps of method 400, as described below. Preferably, the Np-237 based compound is selected such that irradiation of that compound with thermal neutrons converts the Np-237 atoms therein to Np-238 atoms, substantially without causing any other chemical or physical change to the compound. In one illustrative embodiment, the Np-237 based compound is $^{237}NpF_6$ (neptunium-237 hexafluoride), the preparation of which is well known in the art. For details on one exemplary method of preparing $^{237}NpF_6$, see U.S. Pat. No. 2,982,604 to Seaborg et al., entitled "Preparation of Neptunium Hexafluoride," the entire contents of which are incorporated by reference herein. The liquid containing the Np-237 based compound may be loaded into any suitable portion of system 100, e.g., into condenser 134 from which it may circulate to irradiation unit 110. In embodiments in which the Np-237 based compound must be at an increased temperature and/or pressure to remain in the liquid state, both system 100 and the liquid may be pre-pressurized and pre-heated so as to ensure that the liquid may readily flow through system 100.

Method 400 also includes irradiating the liquid containing the Np-237 based compound with thermal neutrons emitted by a nuclear reactor, so as to partially convert the Np-237 based compound to a Np-238 based compound (step 420). For example, the liquid may be flowed through irradiation unit 110 described above with reference to FIGS. 1-2 and 3A, at a rate selected to enhance conversion of Np-237 atoms therein to Np-238 atoms while reducing the likelihood that the Np-238 atoms so produced may decay to Pu-238 atoms within irradiation unit 110, or that such Pu-238 atoms may react with thermal neutrons to form higher plutonium isotopes. In embodiments in which the Np-237 based compound is $^{237}NpF_6$, the Np-238 based compound is preferably $^{238}NpF_6$, which has similar physical and chemical characteristics to $^{237}NpF_6$.

Method 400 also includes retaining the liquid containing the mixture of Np-237 based compound and Np-238 based compound resulting from step 420 for a sufficient amount of time to at least partially convert the Np-238 based compound to a Pu-238 based compound (step 430). For example, the liquid may be transported through decay unit 120 at a flow rate selected to allow at least some of the Np-238 atoms therein to spontaneously decay to Pu-238 atoms. In embodiments in which the Np-237 based compound is $^{237}NpF_6$ and the Np-238 based compound is $^{238}NpF_6$, the Pu-238 based liquid is $^{238}PuF_6$.

Figure 5:
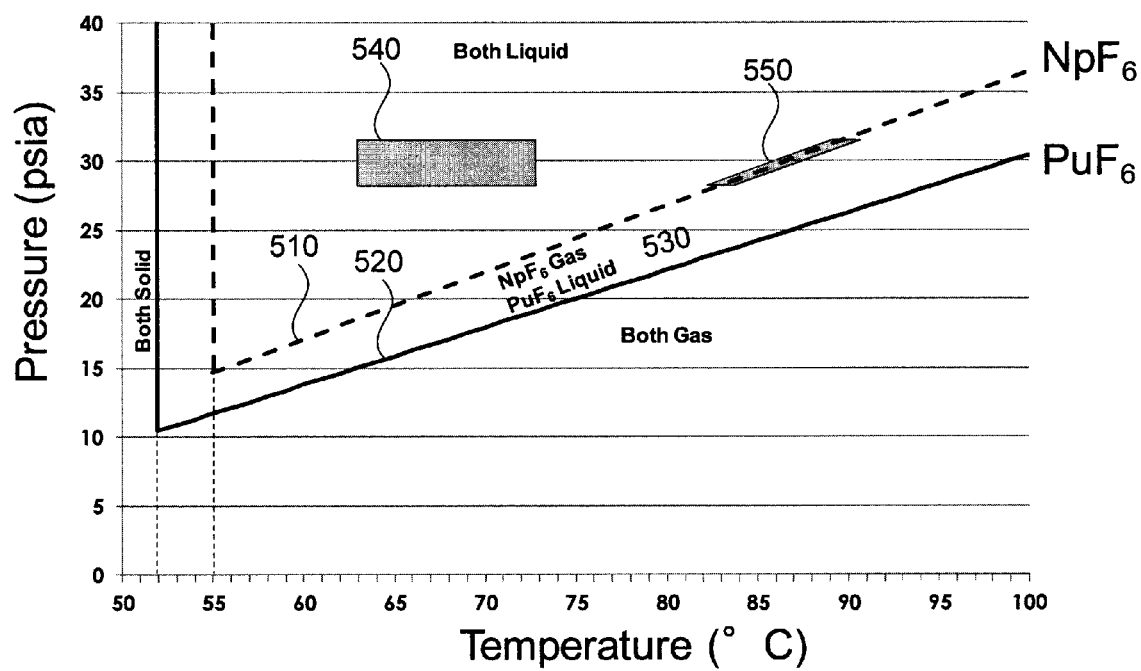
FIG. 5 illustrates phase diagrams of neptunium hexafluoride and plutonium hexafluoride.

Method 400 further includes heating the resulting liquid mixture of Np-237 based compound, Np-238 based compound, and Pu-238 based compound resulting from step 430 to a temperature at the boiling point of the mixture so as to preferentially vaporize the more volatile component(s) of the liquid, and then distilling those component(s) (step 440). For example, the liquid may be introduced to vessel 131 of separation unit 130 where it is heated to a temperature selected based on the boiling point of the liquid at the pressure in vessel 131. For example, FIG. 5 illustrates the phase diagrams for $NpF_6$ and for $PuF_6$ at a variety of temperatures and pressures. It should be understood that different nuclear isotopes of these compounds will have substantially the same temperature and pressure-dependent phase behavior as one another, e.g., both Np-237 and Np-238 hexafluoride may exhibit substantially the same phase behavior as one another, which is different than that of Pu-238 hexafluoride.

It may be seen in FIG. 5 that $NpF_6$ is a solid at pressures above about 15 pounds per square inch absolute (psia) and temperatures below about 55° C., while $PuF_6$ is a solid at pressures above about 10 psia and temperatures below about 52° C. At pressures and temperatures that lie above $NpF_6$ phase line 510, $NpF_6$ is a liquid, while at pressures and temperatures that lie below phase line 510, $NpF_6$ is a vapor. Analogously, at pressures and temperatures that lie above $PuF_6$ phase line 520, $PuF_6$ is a liquid, while at pressures and temperatures that lie below phase line 520, $PuF_6$ is a vapor. As such, at temperatures and pressures that lie above both of phase lines 510 and 520, both $NpF_6$ and $PuF_6$ are liquids, and at temperatures and pressures that lie below both of phase lines 510 and 520, both $NpF_6$ and $PuF_6$ are vapors. At temperatures and pressures that lie in region 530 between lines 510 and 520, $NpF_6$ is a vapor while $PuF_6$ is a liquid. Similarly, FIG. 5 identifies other pressure and temperature combinations at which $NpF_6$ is a solid, while $PuF_6$ is a liquid or a vapor.

As noted further above, the various isotopic analogs of $NpF_6$ and $PuF_6$ preferably remain in the liquid state while being flowed through the various components of system 100, except for separation unit 130. As such, irradiation unit 110 and decay unit 120 suitably may be maintained at any combination of temperature and pressure that lies above both of phase lines 510 and 520 in FIG. 5, for example, by heating irradiation unit 110, decay unit 120, and any pipes connected thereto to the desired temperature using a suitable heater(s), and by applying a gas such as fluorine at the desired pressure above the liquids. Because separation unit 130 preferably operates by heating the liquids therein to a temperature that preferentially vaporizes of only one of the liquids, in some embodiments vessel 131 of separation unit 130 suitably may be maintained at any combination of pressure and temperature that lies within region 530 illustrated in FIG. 5, within which $NpF_6$ is a vapor while $PuF_6$ is a liquid.

However, it may be preferable to apply a substantially constant pressure throughout the various components of system 100, and to vary only the temperature in separation unit 130 relative to the temperatures in irradiation unit 110 and decay unit 120. Region 540 illustrated in FIG. 5 illustrates an exemplary range of pressures and temperatures at which irradiation unit 110 and decay unit 120 may be maintained, e.g., between about 28-32 psia and between about 63-73° C. Region 550 illustrates an exemplary range of temperatures to which vessel 131 of separation unit 130 suitably may be maintained, if the pressure therein is substantially the same as in irradiation unit 110 and decay unit 120, e.g., between about 28-32 psia and between about 82-90° C. Such a temperature and pressure range may preferentially cause vaporization of $^{237}$NpF$_6$ and $^{238}$NpF$_6$ within vessel 131 relative to $^{238}$PuF$_6$, thus facilitating separation of the neptunium based compounds and the plutonium-238 based compound from one another. It will be appreciated that other pressure and temperature combinations suitably may be used, and that other chemical compounds may have different phase diagrams that suitably may be adapted in accordance with the principles set forth herein. For example, a particular plutonium based compound may have a lower boiling point than the neptunium based analog of that compound, in which circumstance vessel 131 may be maintained at a pressure and temperature that preferentially vaporizes the plutonium based compound relative to the neptunium based compound.

Turning back to FIG. 4, method 400 further includes condensing the resulting vapor formed during step 440, so as to form the corresponding liquid (step 450). For example, condensation unit 134 may cool the vapor to a temperature below the liquid's boiling point, thus causing the vapor to return to the liquid phase. In embodiments in which the condensed liquid includes a mixture of the Np-237 based compound and the Np-238 based compound, that liquid mixture optionally may be recirculated to irradiation unit 110 for further irradiation with thermal neutrons 12 (step 450). Alternatively, the liquid condensed in step 450 may be collected for further use. Method 400 also includes collecting the liquid resulting from step 440, e.g., those components that were not preferentially vaporized and distilled (step 460). For example, outlet 136 illustrated in FIG. 3B may be used to collect the liquid from vessel 131, either continually or periodically. Regardless of whether the Pu-238 based liquid is obtained in step 450 or step 460, the liquid may be further processed to obtain a form of Pu-238 suitable for use in energy generation, e.g., plutonium-238 oxide ($^{238}$PuO$_2$), using processing techniques known in the art.

It should be appreciated that system 100 illustrated in FIGS. 1-3D may be adapted for use with any nuclear reactor 10 that generates thermal neutrons having energies suitable for converting the Np-237 compound to the Np-238 based compound. It is of particular note that system 100 does not require inserting material into, or removing material from, reactor 10; instead, the liquid containing the Np-237 based compound merely needs to be brought sufficiently close to reactor 10 so as to receive thermal neutrons therefrom. Indeed, providing some distance (and neutron moderator) between reactor 10 and irradiation unit 110 reduces the risk that the Np-237 based compound in the liquid may be irradiated with fast neutrons, and thus reduces the risk that Np-236 and other undesirable products may be formed. Additionally, the flow rate of the liquid suitably may be varied so as to increase the yield of converting Np-237 to Np-238 and/or to decrease the risk of forming higher plutonium isotopes, based on the particular neutron flux and the desired Pu-238 yield and purity. In contrast, previously known systems that rely upon inserting and removing solid-state material from the nuclear reactor itself increase the material's exposure to fast neutrons and to over-exposure to thermal neutrons, both of which may significantly reduce the isotopic purity of any Pu-238 recovered from the system.

Figure 6:
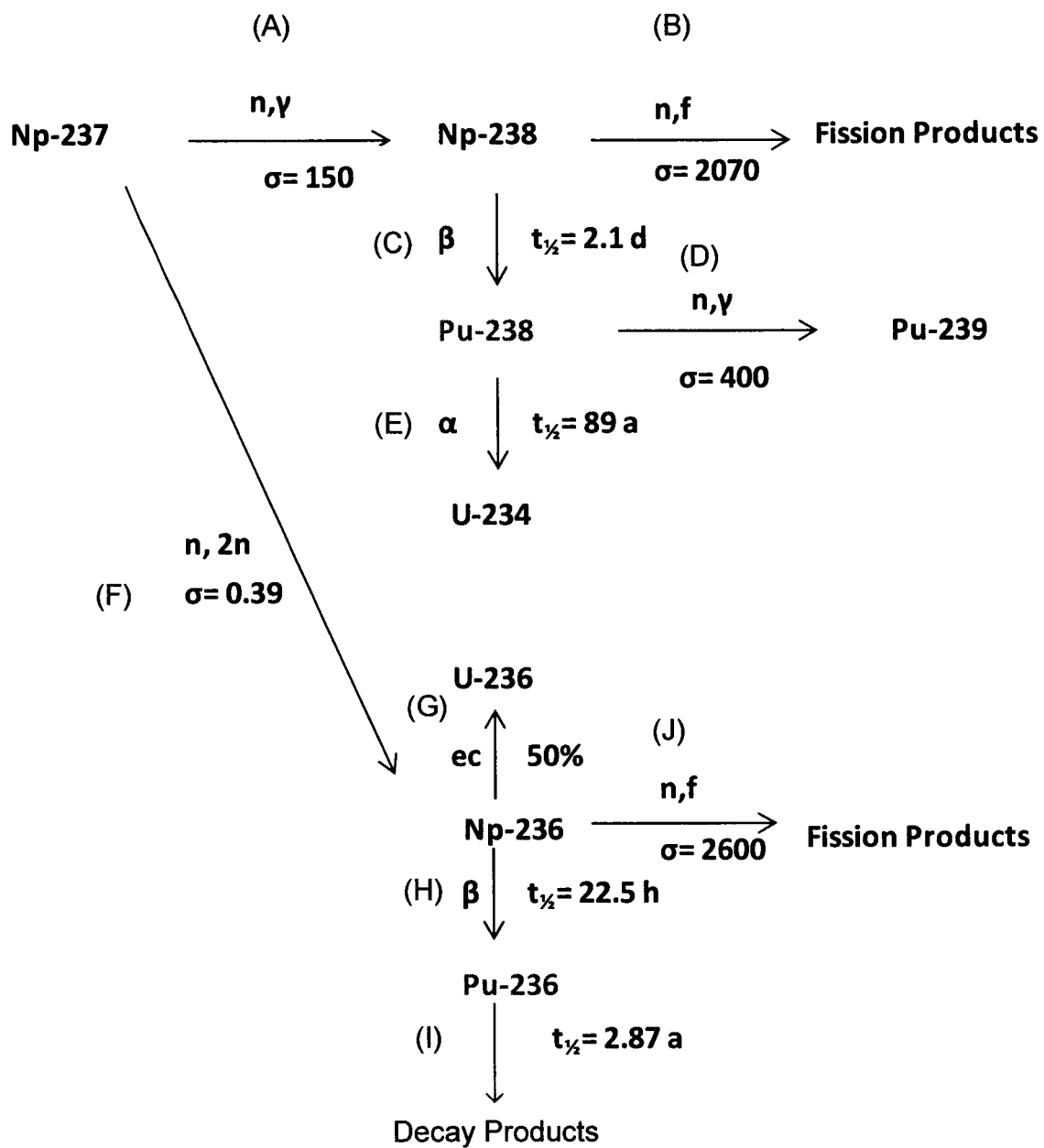
FIG. 6 illustrates reaction products that may be formed while preparing Pu-238 using the present invention or using previously known methods.

Specifically, FIG. 6 illustrates a variety of known reactions, designated (A)-(J), in which Np-237 may participate. For example, in reaction (A), Np-237, which has a relatively small neutron capture cross-section ($\sigma$=150), may react with a thermal neutron (n,$\gamma$) to form Np-238. In reaction (B), the Np-238 may react with a neutron (n,f) to form fission products; alternatively, in reaction (C), the Np-238 may decay spontaneously, with a half-life of 2.1 days, by emitting a beta-particle ($\beta$) to form Pu-238. In reaction (D), the Pu-238 may react with a neutron (n,$\gamma$) to form Pu-239; alternatively, in reaction (E), the Pu-238 may decay spontaneously, with a half life of about 89 years, by emitting an alpha-particle ($\alpha$) to form U-234. It should be noted that the Np-238 formed via reaction (A) has a relatively large neutron capture cross-section ($\sigma$=2070), so continued irradiation increases the risk that fission products may be formed in reaction (B); although such fission products may not reduce the overall purity of Pu-238 that is formed, such fission products still may reduce the expected yield of Pu-238. Pu-238 formed via reaction (C) also has a relatively large neutron capture cross-section ($\sigma$=400), so increased irradiation increases the risk that Pu-239 may be formed, which reduces the isotopic purity of Pu-238.

Alternatively, in reaction (F), the Np-237 undergoes an (n,2n) reaction with fast neutrons to form Np-236. In reaction (G), the Np-236 may decay with an electron capture of 50% to U-236; alternatively, in reaction (H), the Np-236 may decay spontaneously, with a half life of 22.5 hours, by emitting a beta-particle ($\beta$) to form Pu-236. In reaction (I), the Pu-236 may decay spontaneously, with a half life of 2.87 years, to other decay products. In still another alternative reaction (J), the Np-236 may react with a neutron (n,f) to form still other fission products. Note that although the U-236 formed in reaction (G) may be removed chemically, any Pu-236 formed cannot easily be removed from Pu-238 and thus lowers the isotopic purity of Pu-238. Additionally, because the decay products of Pu-236 are potentially hazardous, only a very small amount of Pu-236 may be permitted in the final composition. For example, NASA permits only 2 μg of Pu-236 per gram of Pu-238 to be included in any material for use in an RTG.

The previously known, solid-state Np-237 based method described by Jones and known in the art may allow some, if not all, of reactions (A)-(J) to proceed, with a concomitant loss in purity of any Pu-238 that may be produced. By comparison, the systems and methods of the present invention substantially inhibit any reactions of Np-237 or its products with fast neutrons, thus essentially cutting off side reactions (F)-(J). The systems and methods of the present invention further inhibit further reaction of Pu-238 with thermal neutrons, thus essentially cutting off side reactions (B) and (D). Accordingly, the systems and methods of the present invention allow Np-237 to proceed along substantially along a single reaction chain of those illustrated in FIG. 6: reaction (A), which forms Np-238, primarily occurs in irradiation unit 110; reaction (C), which forms Pu-238 and primarily occurs in decay unit 120; and reaction (E), which forms U-234 and occurs when the Pu-238 is used to generate energy.

Note, because certain embodiments of the present invention may recirculate a liquid containing a mixture of a Np-237 based compound and a Np-238 based compound to irradiation unit 110 for further neutron irradiation, there is an increased risk that the recirculated Np-238 may proceed along reaction (B) to form fission products or Np-239 which decays to Pu-239. Table 1 lists the expected products of Np-238 leaving irradiation unit 110 following a 24-hour trip through the unit. From Table 1, it may be seen that about 85% of the Np-238 created within irradiation unit 110 is expected to remain unchanged when it exits irradiation unit 110, while about 15% is expected to form Pu-238, less than 0.5% is expected to form fission products, and only about 0.02% is expected to form Pu-239. Note that Np-238 that is produced within irradiation unit 110 is expected to receive less neutron irradiation. During the flow through the rest of the system (units 120 and 130) decay continues and the neptunium isotopes decay into plutonium isotopes. Table 1 shows the new relative concentration (although the plutonium isotopes are retained in unit 130 and not returned to unit 110 as annotated by the *) as the originally converted materials return to unit 110.

TABLE 1

Expected Products of Np-238 Leaving and Returning to Irradiation Unit 110

| Product | % of Expected Products Leaving Unit 110 | % of Expected Products Returning to Unit 110 |
|---|---|---|
| Np-238 | 84.8 | 28.8 |
| Pu-238 | 14.7 | 70.7* |
| Fission Products | 0.41 | 0.41 |
| Np-239 | 0.08 | 0.03 |
| Pu-239 | 0.02 | 0.07* |

Based on the expected products of returning remaining Np-238 from condenser 134 to irradiation unit 110 for a single given trip duration through the unit, the expected products for a repeated number of such cycles may be determined, and are listed in Table 2 for a 24 hour trip time through irradiation unit 110 and an 81.4 hour trip time through the remaining components of system 100, corresponding to 1.6 half lives of Np-238. Again, the plutonium isotopes are retained in unit 130 but are provided to show the relative concentrations. The column pass indicates the number of times the original neptunium/decay products pass through the system. The rows indicate the relative concentrations of the originally converted material at two points in the system, when it leaves unit 110 and when it leaves the combined unit 120/130 (that is, when it reenters unit 110). This illustrates that most of the converted material in unit 130 is high purity Pu-238.

TABLE 2

Expected Products of Repeated Np-238 Cycles Through Irradiation Unit 110

| Pass | Leaving Unit | Np-238 | Pu-238* | Np-239 | Pu-239* | FP |
|---|---|---|---|---|---|---|
| 1 | 110 | 84.83% | 14.66% | 0.08% | 0.02% | 0.41% |
|   | 120 + 130 | 28.79% | 70.69% | 0.03% | 0.07% | 0.41% |
| 2 | 110 | 20.53% | 78.68% | 0.06% | 0.09% | 0.63% |
|   | 120 + 130 | 6.97% | 92.24% | 0.02% | 0.13% | 0.63% |
| 3 | 110 | 4.97% | 94.17% | 0.03% | 0.14% | 0.69% |
|   | 120 + 130 | 1.69% | 97.46% | 0.01% | 0.16% | 0.69% |
| 4 | 110 | 1.20% | 97.92% | 0.01% | 0.16% | 0.70% |
|   | 120 + 130 | 0.41% | 98.72% | 0.00% | 0.17% | 0.70% |
| 5 | 110 | 0.29% | 98.83% | 0.00% | 0.17% | 0.70% |
|   | 120 + 130 | 0.10% | 99.02% | 0.00% | 0.17% | 0.70% |

In a second illustrative example, the flow rate of the system is doubled. Table 3 lists the expected products of Np-238 that leaving irradiation unit 110 following a 12-hour trip through the unit. From Table 3, it may be seen that about 92% of the Np-238 created within irradiation unit 110 is expected to remain unchanged when it exits irradiation unit 110, while about 7.7% is expected to form Pu-238, less than 0.3% is expected to form fission products, and only about 0.01% is expected to form Pu-239. During the movement through the rest of the system (units 120 and 130) decay continues and the neptunium isotopes decay into plutonium isotopes. Table 3 shows the new relative concentration (although the plutonium isotopes (*) are retained in unit 130 and not returned to unit 110) as the originally converted materials return to unit 110.

TABLE 3

Expected Products of Np-238 in the first pass with double flow rate

| Product | % of Expected Products Leaving Unit 110 | % of Expected Products Returning to Unit 110 |
|---|---|---|
| Np-238 | 92 | 53.6 |
| Pu-238 | 7.7 | 46.1* |
| Fission Products | 0.22 | 0.22 |
| Np-239 | 0.04 | 0.03 |
| Pu-239 | 0.01 | 0.02* |

As the material completes multiple cycles through the system, the neptunium isotopes decay to plutonium as before. However due to the higher flow rate, the relative distribution of products made is slightly improved (lower Pu-239 and fission products). Even after five cycles, about 3% of the Np-238 has yet to decay due to the lower total time elapsed given the higher flow rate.

TABLE 4

Expected Products of Repeated Np-238 Cycles Through Irradiation Unit 110 with double flow rate

| Pass | Leaving Unit | Np-238 | Pu-238* | Np-239 | Pu-239* | FP |
|---|---|---|---|---|---|---|
| 1 | 110 | 91.99% | 7.74% | 0.04% | 0.01% | 0.22% |
|   | 120 + 130 | 53.59% | 46.13% | 0.03% | 0.02% | 0.22% |
| 2 | 110 | 45.25% | 54.20% | 0.07% | 0.03% | 0.44% |
|   | 120 + 130 | 26.36% | 73.09% | 0.04% | 0.06% | 0.44% |
| 3 | 110 | 22.26% | 77.06% | 0.06% | 0.07% | 0.55% |
|   | 120 + 130 | 12.97% | 86.35% | 0.04% | 0.09% | 0.55% |
| 4 | 110 | 10.95% | 88.30% | 0.04% | 0.10% | 0.61% |
|   | 120 + 130 | 6.38% | 92.87% | 0.03% | 0.12% | 0.61% |
| 5 | 110 | 5.39% | 93.83% | 0.03% | 0.12% | 0.63% |
|   | 120 + 130 | 3.14% | 96.08% | 0.02% | 0.13% | 0.63% |

In a third illustrative example, the flow rate of the system is halved. Table 5 lists the expected products of Np-238 that leaving irradiation unit 110 following a 48-hour trip through the unit. From Table 5, it may be seen that about 73% of the Np-238 created within irradiation unit 110 is expected to remain unchanged when it exits irradiation unit 110, while about 26% is expected to form Pu-238, less than 0.8% is expected to form fission products, and only about 0.1% is expected to form Pu-239. During the half flow rate movement through the rest of the system (units 120 and 130) decay continues and the neptunium isotopes decay into plutonium isotopes. Table 5 shows the new relative concentration (although the plutonium isotopes (*) are retained in unit 130 and not returned to unit 110) as the originally converted materials return to unit 110.

TABLE 5

Expected Products of Np-238 in the first pass with half flow rate

| Product | % of Expected Products Leaving Unit 110 | % of Expected Products Returning to Unit 110 |
|---|---|---|
| Np-238 | 72.7 | 8.4 |
| Pu-238 | 26.4 | 90.7* |
| Fission Products | 0.74 | 0.74 |
| Np-239 | 0.13 | 0.02 |
| Pu-239 | 0.07 | 0.18* |

As the material completes multiple cycles through the system, the neptunium isotopes decay to plutonium as before. However due to the lower flow rate, the relative distribution of products made is slightly degraded (higher Pu239 and fission products), as shown in Table 6.

TABLE 6

Expected Products of Repeated Np-238 Cycles Through
Irradiation Unit 110 with half flow rate

| Pass | Leaving Unit | Np-238 | Pu-238* | Np-239 | Pu-239* | FP |
|---|---|---|---|---|---|---|
| 1 | 110 | 72.65% | 26.41% | 0.13% | 0.07% | 0.74% |
|   | 120 + 130 | 8.37% | 90.69% | 0.02% | 0.18% | 0.74% |
| 2 | 110 | 4.26% | 94.66% | 0.03% | 0.21% | 0.85% |
|   | 120 + 130 | 0.49% | 98.43% | 0.00% | 0.23% | 0.85% |
| 3 | 110 | 0.25% | 98.66% | 0.00% | 0.24% | 0.85% |
|   | 120 + 130 | 0.03% | 98.88% | 0.00% | 0.24% | 0.85% |
| 4 | 110 | 0.01% | 98.89% | 0.00% | 0.24% | 0.85% |
|   | 120 + 130 | 0.00% | 98.91% | 0.00% | 0.24% | 0.85% |
| 5 | 110 | 0.00% | 98.91% | 0.00% | 0.24% | 0.85% |
|   | 120 + 130 | 0.00% | 98.91% | 0.00% | 0.24% | 0.85% |

With the three flow rate illustrations a comparison of the relative concentrations after the same total time provides a comparison of the system performance under different flow conditions. Using 25.8 days (time for system flow to complete six passes with normal flow rate), Table 7 shows the effect of flow rate on the relative amounts of the products. The higher flow rate has slightly improved Pu-238 purity and reduced fission products but all three flow rates show effectively the same improvement over solid target systems.

TABLE 7

Expected Products of Repeated Np-238 Cycles Through Irradiation
Unit 110 with various flow rates after the same amount of time

| Flow Rate | Np238 | Pu238 | Np239 | Pu239 | FP |
|---|---|---|---|---|---|
| Double | 0.02% | 99.17% | 0.00% | 0.15% | 0.66% |
| Normal | 0.02% | 99.10% | 0.00% | 0.17% | 0.70% |
| Half | 0.03% | 98.88% | 0.00% | 0.24% | 0.85% |

It should be understood that the flow rates and compounds described with reference to Tables 1-7 are intended to be purely illustrative, and not limiting of the invention.

Because the systems and methods of the present invention cause Np-237 to proceed almost exclusively along reaction (A) relative to reaction (F) illustrated in FIG. 6, and because the resulting Np-238 is believed to proceed almost exclusively along reaction (C) relative to reaction (B), and because the resulting Pu-238 is believed to proceed almost exclusively along reaction (E) relative to reaction (D), it is believed that the Pu-238 formed via reactions (A) and (C) will have an isotopic purity about, or even exceeding, 99%. By comparison, it is believed that only about 64% of any Np-238 formed by previously known, solid-state Np-237 based methods may proceed along reaction (C) to form and remain Pu-238, while about 23% may proceed along reaction (B) and about 13% may proceed along reaction (D) because of the presence of excess thermal neutrons. As such, it is believed that such previously known methods may provide Pu-238 having an isotopic purity of about 83%. Additionally, the presence of fast neutrons also may permit reactions (F)-(J) to proceed, thus resulting in production of additional unwanted side products and reduced yield and purity of Pu-238.

Accordingly, embodiments of the present invention are expected to provide Pu-238 having a particularly high isotopic purity relative to those obtainable using previously known methods, particularly those based upon solid-state Np-237. Additionally, it should be noted that the systems and methods of the present invention have relatively few steps, are relatively simple mechanically and chemically, and require no modification of (or even internal access to) the nuclear reactor used as a neutron source. Indeed, any neutron source suitably may be used that generates neutrons having suitable energies.

While various illustrative embodiments of the invention are described above, it will be apparent to one skilled in the art that various changes and modifications may be made therein without departing from the invention. For example, although the embodiments described above have primarily focused on use of hexafluoride compounds of neptunium and plutonium, it should be understood that other compounds of neptunium and plutonium suitably may be used. Preferably, both neptunium and plutonium analogs of such compounds will be liquids at a practicable temperature and pressure, and may have different boiling points than one another, allowing one of the compounds to be preferentially vaporized relative to the other and distilled. For another example, although the embodiments described above have primarily focused on use of distillation to separate neptunium and plutonium compounds, it should be understood that other separation systems/methods suitably may be used, including chemical separation as is known in the art. The appended claims are intended to cover all such changes and modifications that fall within the true spirit and scope of the invention.

What is claimed:

1. A system for preparing plutonium-238 (Pu-238) using neutrons, the system comprising:
   an irradiation unit receiving a liquid comprising neptunium-237 (Np-237) hexafluoride and receiving the neutrons for a sufficient amount of time such that the neutrons convert a portion of the Np-237 hexafluoride to neptunium-238 (Np-238) hexafluoride, resulting in a first liquid mixture comprising Np-237 hexafluoride and Np-238 hexafluoride;
   first piping coupled to the irradiation unit;
   a decay unit coupled to the first piping,
      the decay unit comprising at least one retention tank continuously receiving the first liquid mixture from the irradiation unit via the first piping,
      the at least one retention tank is arranged to retain the first liquid mixture for a sufficient amount of time for the Np-238 hexafluoride to at least partially convert to plutonium-238 (Pu-238) hexafluoride, resulting in a second liquid mixture comprising Np-237 hexafluoride, Np-238 hexafluoride, and Pu-238 hexafluoride;
   second piping coupled to the at least one retention tank;
   a separation unit coupled to the second piping,
      the separation unit continuously receiving the second liquid mixture from the at least one retention tank via the second piping,
      the separation unit continuously separating Np-237 hexafluoride and Np-238 hexafluoride from Pu-238 hexafluoride in the second liquid mixture based on fractional distillation,
      the separation unit continuously removing a third liquid mixture comprising the separated Np-237 hexafluoride and Np-238 hexafluoride, and
      the separation unit continuously collecting a fourth liquid mixture from which the third liquid mixture was separated,
         the fourth liquid mixture comprising Pu-238 hexafluoride; and
   third piping coupled to the separation unit and to the irradiation unit,
      the third piping continuously recycling the third liquid mixture from the separation unit back to the irradiation unit.

2. The system of claim 1, wherein the irradiation unit comprises a plurality of pipes or panels each receiving the liquid comprising Np-237 hexafluoride.

3. The system of claim 2, further comprising fourth piping connecting the pipes or panels with one another.

4. The system of claim 1, wherein the decay unit comprises a plurality of retention tanks receiving the first liquid mixture.

5. The system of claim 4, further comprising pipes connecting the retention tanks in series with one another.

6. The system of claim 1, wherein the decay unit comprises a packed vessel, the packed vessel receiving the first liquid mixture and transporting the first liquid mixture through the packed vessel in essentially plug flow.

7. The system in claim 1 wherein the separation unit comprises a vessel heating the second liquid mixture to a temperature at or above a boiling point of the second liquid mixture, so as to preferentially vaporize the third liquid mixture, and an outlet collecting the fourth liquid mixture.

8. The system of claim 7, wherein the separation unit further comprises a distillation unit preferentially distilling the vaporized third liquid mixture, the distillation unit comprising:
  a distillation column coupled to the vessel heating the second liquid mixture;
  a partial condenser which refluxes a portion of a vapor product of the distillation column back down the distillation column to effect fractional distillation;
  a conduit; and
  a total condenser,
  the conduit transporting the preferentially distilled and vaporized third liquid mixture to the total condenser, the total condenser condensing that preferentially distilled and vaporized third liquid mixture into a liquid.

9. The system of claim 8, wherein the distillation column comprises a plurality of distillation plates.

10. The system of claim 8, wherein the distillation column is configured as a packed column.

11. The system of claim 8, the third piping connecting the total condenser to the irradiation unit so as to return the third liquid mixture to the irradiation unit.

12. The system of claim 1, wherein the second liquid mixture further comprises Pu-238 tetrafluoride.

13. The system of claim 1, wherein the neutrons are emitted by a nuclear reactor.

14. The system of claim 13, further comprising a common pool in which the nuclear reactor and at least a portion of the irradiation unit are disposed.

15. A method for preparing plutonium-238 (Pu-238) using neutrons, the method comprising:
  at an irradiation unit,
    receiving a liquid comprising neptunium-237 (Np-237) hexafluoride and
    receiving the neutrons for a sufficient amount of time such that the neutrons convert a portion of the Np-237 hexafluoride to neptunium-238 (Np-238) hexafluoride,
    resulting in a first liquid mixture comprising Np-237 hexafluoride and Np-238 hexafluoride;
  at a decay unit including at least one retention tank,
    continuously receiving at the at least one retention tank the first liquid mixture from the irradiation unit via first piping that is coupled to the irradiation unit and to the decay unit,
    retaining the first liquid mixture at the at least one retention tank for a sufficient amount of time for the Np-238 hexafluoride to at least partially convert to plutonium-238 (Pu-238) hexafluoride,
    resulting in a second liquid mixture comprising Np-237 hexafluoride, Np-238 hexafluoride, and Pu-238 hexafluoride; and
  at a separation unit,
    continuously receiving the second liquid mixture from the at least one retention tank via second piping that is coupled to the at least one retention tank,
    continuously separating Np-237 hexafluoride and Np-238 hexafluoride from Pu-238 hexafluoride in the second liquid mixture based on fractional distillation,
    continuously removing a third liquid mixture comprising the separated Np-237 hexafluoride and Np-238 hexafluoride, and
    continuously collecting a fourth liquid mixture from which the third liquid mixture was separated,
      the fourth liquid mixture comprising Pu-238 hexafluoride; and
  continuously recycling the third liquid mixture from the separation unit back to the irradiation unit via third piping that is coupled to the separation unit and to the irradiation unit.

16. The method of claim 15, wherein the irradiation unit comprises a plurality of pipes or panels each receiving the liquid comprising Np-237 hexafluoride.

17. The method of claim 16, wherein fourth piping connects the pipes or panels with one another.

18. The method of claim 15, a plurality of retention tanks receiving the first liquid mixture.

19. The method of claim 18, wherein the retention tanks are connected in series with one another.

20. The method of claim 15, wherein said separating comprises heating the second liquid mixture in a vessel to temperature at or above a boiling point of the second liquid mixture, so as to preferentially vaporize the third liquid mixture.

21. The method of claim 20, said separating further comprising preferentially distilling, vaporizing, and subsequently condensing into a liquid the third liquid mixture.

22. The method of claim 15, wherein the second liquid mixture further comprises Pu-238 tetrafluoride.

23. The method of claim 15, wherein the neutrons are emitted by a nuclear reactor.

24. The method of claim 23, said irradiation unit being disposed in a common pool with the nuclear reactor and receiving the neutrons from the nuclear reactor.

* * * * *